United States Patent [19]

Abe et al.

[11] Patent Number: 5,431,231

[45] Date of Patent: Jul. 11, 1995

[54] HARVESTER FOR ROOT VEGETABLES

[75] Inventors: Touru Abe; Toshiyuki Kobuchi; Hisayoshi Tokunaga; Takeshi Kobashi, all of Okayama, Japan

[73] Assignee: Kabashi Kogyo Co., Ltd., Okayama, Japan

[21] Appl. No.: 100,211

[22] Filed: Aug. 2, 1993

[30] Foreign Application Priority Data

| Aug. 6, 1992 | [JP] | Japan | 4-231391 |
| Aug. 6, 1992 | [JP] | Japan | 4-231392 |
| Aug. 7, 1992 | [JP] | Japan | 4-061539 U |
| Dec. 10, 1992 | [JP] | Japan | 4-352690 |
| Dec. 10, 1992 | [JP] | Japan | 4-352691 |

[51] Int. Cl.[6] .................. A01D 29/00; A01D 33/02
[52] U.S. Cl. ........................... 171/26; 171/1; 171/25; 56/119
[58] Field of Search .......... 56/327 R, 121.4, 327, 56/119; 171/1, 26, 27, 28, 31, 32, 34, 35, 36, 60, 61, 42, 25; 104/139, 140, 165; 198/512, 604, 624

[56] References Cited

U.S. PATENT DOCUMENTS

| 938,881 | 11/1909 | Lee | 198/512 X |
| 1,880,324 | 10/1932 | Malcom et al. | 198/512 X |
| 2,833,357 | 5/1958 | Lust | 171/61 |
| 3,589,117 | 6/1971 | Wadsworth | 171/42 X |
| 3,780,511 | 12/1973 | Avis | 171/28 X |
| 3,800,518 | 4/1974 | Baggiolini et al. | 171/38 X |
| 4,182,420 | 1/1980 | Hurliman et al. | 171/38 |
| 4,373,589 | 2/1983 | Hagiz | 171/31 |
| 4,607,703 | 8/1983 | Wang | 171/27 |
| 4,753,296 | 6/1988 | Kruithoff | 171/26 |
| 4,921,050 | 5/1990 | Brown | 171/61 X |
| 4,967,848 | 11/1990 | Frankstein | 171/36 |

Primary Examiner—Dave W. Arola
Assistant Examiner—Robert Pezzuto
Attorney, Agent, or Firm—Nikaido, Marmelstein, Murray & Oram

[57] ABSTRACT

A harvester for root vegetables has a body, a pair of crawlers for supporting and moving the body, and an engine for driving the crawlers. A picker/conveyer device is longitudinally provided on the body and downwardly inclined for picking up root vegetables, and a stalk cutter device is provided under the picker/-conveyer device at a rear portion thereof for cutting off a stalk from a root.

15 Claims, 11 Drawing Sheets

HARVESTER FOR ROOT VEGETABLES

BACKGROUND OF THE INVENTION

The present invention relates to a harvester for harvesting root vegetables such as carrot, radish and white radish from fields.

As a conventional harvester for root vegetables, there have been used a carrot harvester which has a digger blade, and a pair of endless belt conveyers provided at a rear portion of the digger blade for picking up the carrot from the field and conveying them to the rearward. Such a machine operates to dig up carrots from the field and discharges them on the field. Therefore, it is necessary to pick up the dug carrots from the field, and to cut a stalk from a root of the carrot. Accordingly, it takes much more time and labor. Furthermore, since the belt conveyers are integrally attached on a body of the harvester, it is difficult to adjust the position of the conveyer on a row of carrots.

Japanese Utility Model Application Laid-open 60-125825 discloses a carrot harvester. In the harvester, the stalk of the carrot is engaged with a pair of endless belts to be picked up from the field and fed to a rear portion of the harvester. During the feeding, the stalk is cut from a root of the carrot by a cutter. The root is dropped on a corrugated belt conveyer and conveyed to a hopper. In the harvester, it is necessary to sort the root in the hopper in accordance with the quality of the root. Such a sorting operation requires much time and labor.

SUMMARY OF THE INVENTION

An object of the present invention is to provide a harvester for root vegetables which may eliminate the above mentioned disadvantages.

According to the present invention, there is provided a harvester for root vegetables, having a body, a pair of crawlers for supporting and moving the body, and an engine for driving the crawlers through a power transmitting system.

The harvester comprises a picker/conveyer device longitudinally provided on the body and downwardly inclined for picking up root vegetables, and a stalk cutter device provided under the picker/conveyer device at a rear portion thereof for cutting off a stalk from a root. A digger blade is provided before a front end of the picker/conveyer device so as to dig up root vegetables in a field. A container is provided under the stalk cutter device for receiving a root cut off by the stalk cutter device.

The other objects and features of this invention will become understood from the following description with reference to the accompanying drawings.

DETAILED DESCRIPTION OF THE PREFERRED EMBODIMENTS

Figure 1:
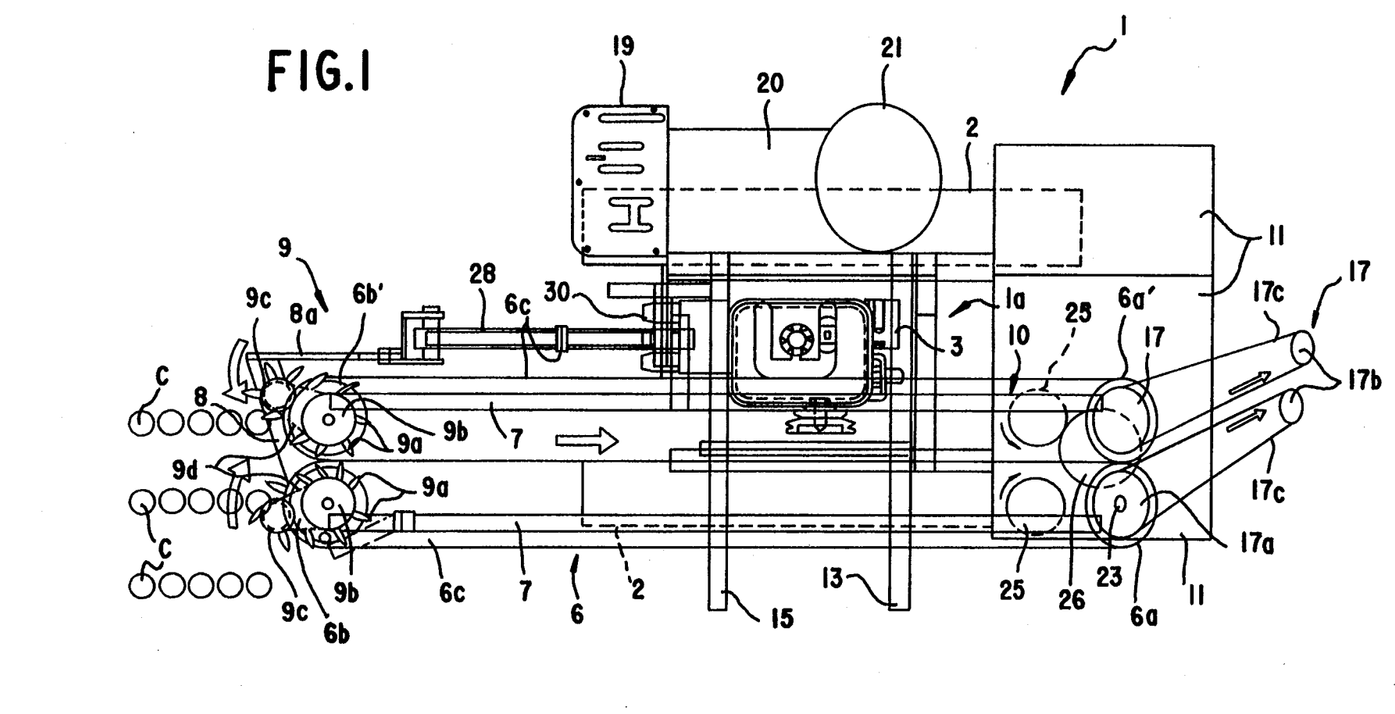
FIG. 1 is a plan view showing a carrot harvester according to the present invention.
Figure 2:
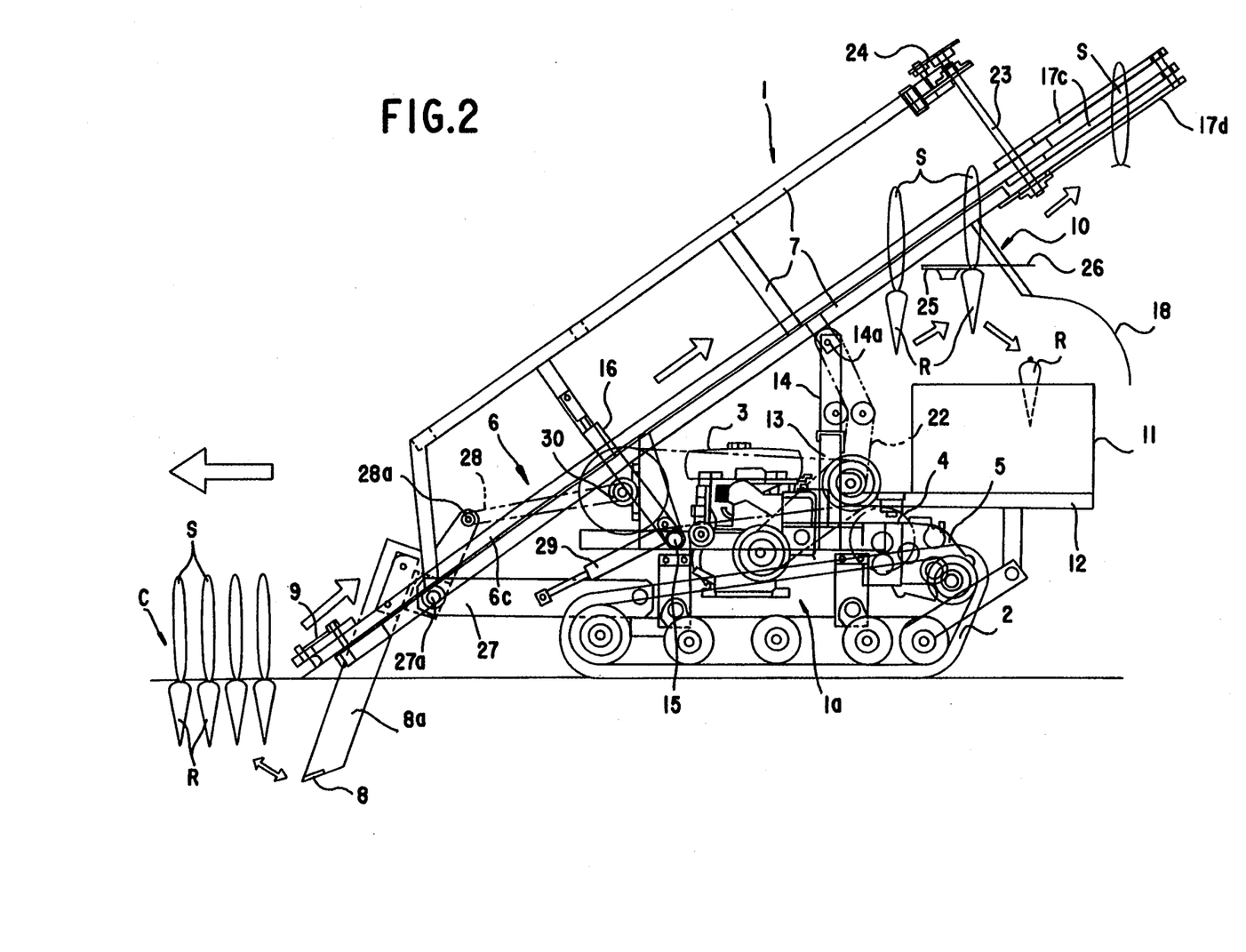
FIG. 2 is a side view of the carrot harvester.
Figure 3:
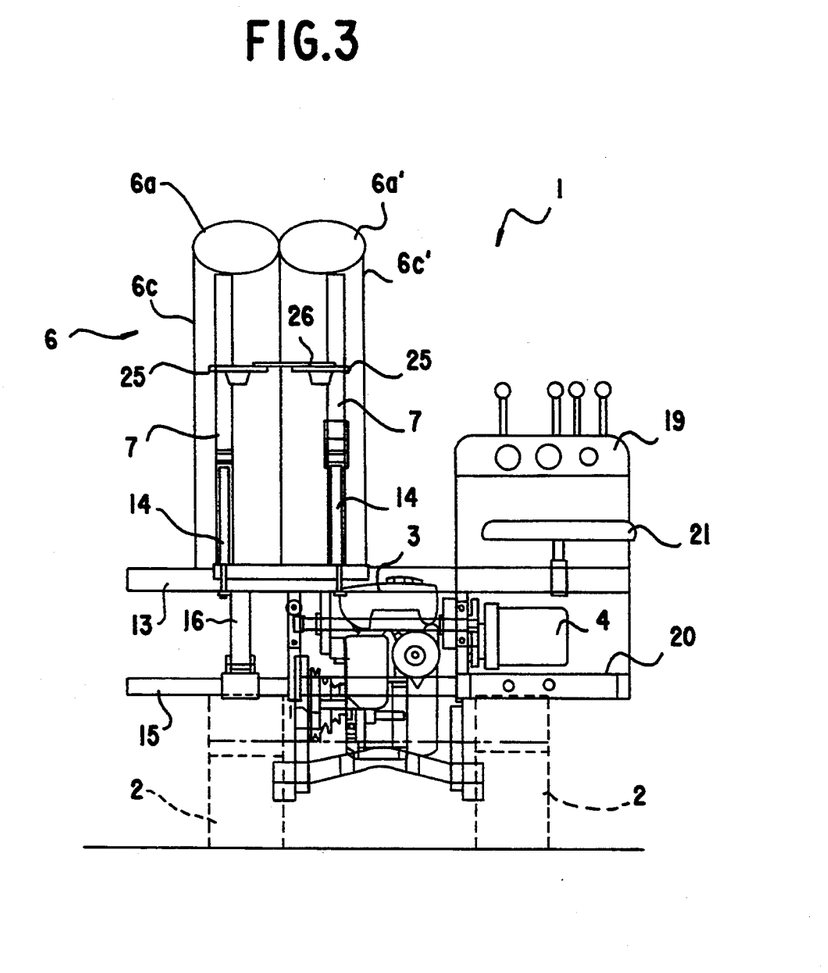
FIG. 3 is a rear view of the carrot harvester.

Referring to FIGS. 1 to 3, a harvester 1 of the present invention is applied to a harvester for harvesting carrot. The harvester 1 has a body 1a, and a pair of crawlers 2 provided under the body 1a on the opposite sides thereof for moving the body. An engine 3 is mounted on the body 1a, and a hydraulic unit 4 driven by the engine 3 is provided adjacent to the engine. A transmission 5 is provided on the rear of the engine 3 for variably controlling the speed of the crawlers 2 and operating the steering of the crawlers.

In front of the body 1a, a picker/conveyer device 6 is mounted for picking up a stalk S of the carrot C in the field and conveying them onto the harvester 1. The picker/conveyer device 6 comprises a downwardly inclined frame 7, a digger blade 8 secured to the front end of the frame 7, a pair of drive pulleys 6a, 6a' and a pair of driven pulleys 6b, 6b' laterally and rotatably mounted between the opposite side members of the frame 7, a pair of endless belt conveyers 6c, 6c' provided between the pulleys 6a, 6b and the pulleys 6a', 6b' respectively, and a raking device 9 provided on the front end of the belt conveyers 6c and 6c'.

The frame 7 of the conveyer device 6 is rotatably mounted on a shaft 14a of support members 14 mounted on a lateral rear bar 13 of the body 1a. A hydraulic cylinder 16 is mounted on a lateral front bar 15 of the body 1a and operatively connected to the frame 7 for adjusting the inclination angle of the picker/conveyer device 6, namely the depth of the digging. The support members 14 and the hydraulic cylinder 16 can be laterally moved on the respective bars 13 and 15 for adjusting the lateral disposition of the picker/conveyer device 6.

The belt conveyers 6c and 6c' are rotated by the drive pulleys 6a and 6a' in the opposite directions so that the inside opposite belts are moved in the same upward direction shown by an arrow. The belts are operated at the front ends thereof to engage stalks of the carrots between the inside running belts and pick up them from the soil to convey them to the rearward of the device 6.

The digger blade 8 is adapted to be operated to dig up the soil at the lower portion of a root R of the carrot C together with the carrot. The blade 8 is connected to a lower arm 27 and an upper arm 28 through a frame 8a. The frame 8a is pivotally connected to the lower arm 27 at a pivot 27a and to the upper arm 28 at a pivot 28a. The other end of the lower arm 27 is pivoted on the body 1a and a hydraulic cylinder 29 is provided between the arm 27 and the body for adjusting the vertical position of the blade. The other end of the upper arm 28 is connected to a crank 30 for vibrating the blade in the forward and backward directions about the pivot 27a.

The raking device 9 is provided for raking the stalk S of the carrot C when dug up by the digger blade 8. The raking device 9 comprises a pair of large pulleys 9b coaxially mounted on the pulleys 6b and 6b' of the picker/conveyer device 6, a pair of small pulleys 9c and a pair of endless belts 9d engaged with the pulleys 9b and 9c. A plurality of projections 9a are provided on the outer surface of each belt 9d to be engaged with stalks S for raking the carrots C.

The stalks S of the carrots C raked by the device 9 are nipped by the belt conveyers 6c and 6c' to be conveyed by the belts.

Figures 4, 5:
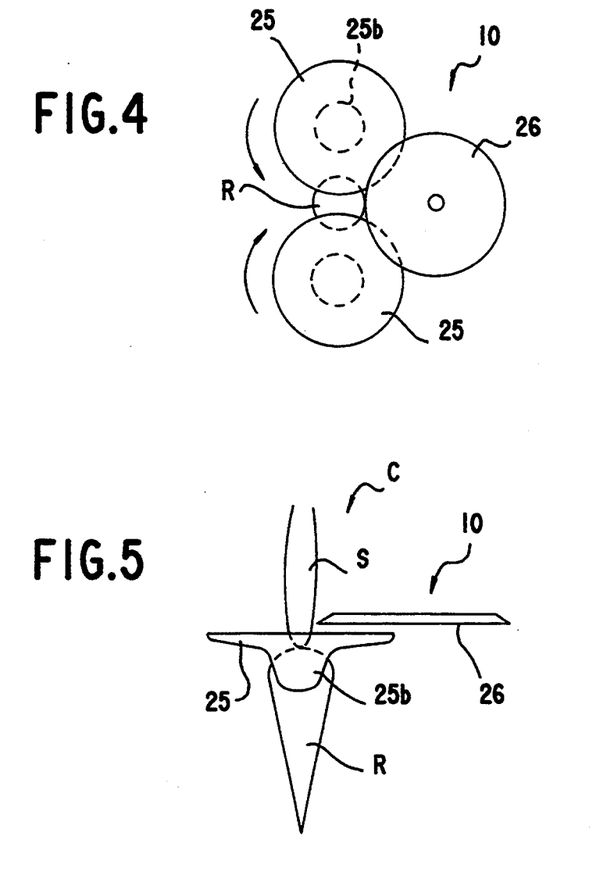
FIG. 4 is a plan view schematically showing a stalk cutter device.
FIG. 5 is a side view of the cutter device.

On the lower portion of the picker/conveyer device 6, a stalk cutter device 10 is provided at a rear portion thereof. As shown in FIGS. 4 and 5, the cutter device 10 comprises a pair of positioning discs 25 having lower projections 25b and rotatable in the directions shown by arrows for positioning the carrot there-between, and a rotary blade 26 for cutting off the stalk S of the carrot C from the root R at a predetermined position.

Figure 6:
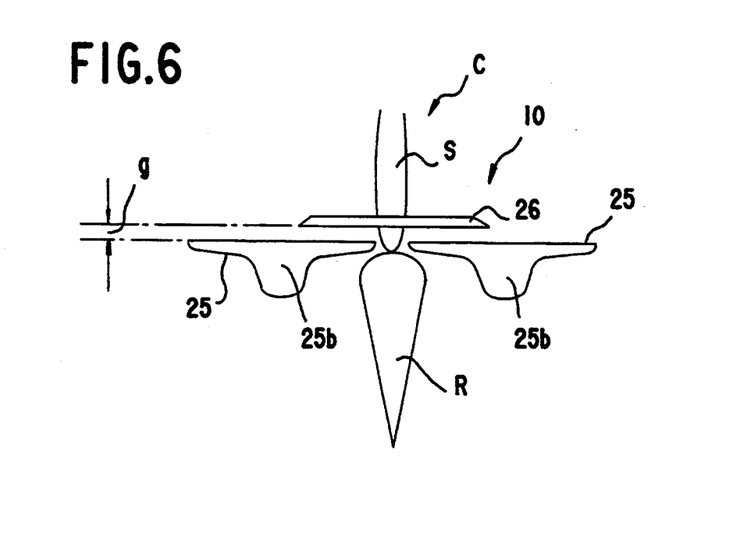
FIG. 6 is a rear view of the cutter device.

Referring to FIG. 6, a gap g is provided between the disc 25 and the blade 26, which is adjustable for adjusting the cutting position of the stalk S.

Thus, the stalk is cut at different positions in dependency on the kind of the root vegetable other than the carrot.

Furthermore, at a lower portion of the device 10, a stand 12 is provided on which a container 11 is mounted for containing the roots R.

Behind the picker/conveyer device 6, a stalk discharge device 17 is provided corresponding to the conveyers 6c and 6c'. The device 17 comprises a pair of large pulleys 17a coaxially mounted on the drive pulleys 6a and 6a' of the device 6, a pair of small pulleys 17b rotatably mounted on base plates 17d, and a pair of endless belts 17c engaged with the pulleys 17a, 17b.

The stalk S of the carrot cut off by the device 10 is engaged between the belts 17c and conveyed to the rearward to be discharged on the field.

A cover 18 is provided on the frame 7 for covering the container 11, so that the discharged stalk S is prevented from dropping in the container 11.

An operation section 19 is located on a side of the conveyer 6c' and a driver's seat 21 is provided adjacent the operation section 19. A step 20 is provided at a lower portion of the operation section 19 corresponding to the seat 21.

In order to drive the belt conveyers 6c and 6c', the power of the engine is transmitted to the drive pulley 6a through a transmission 22 to rotate the belt 6c. The rotating power of the pulley 6a is transmitted to the pulley 6a' through a rotating shaft 23 of the pulley 6a and a gear 24 mounted on the shaft 23 to rotate the belt 6c'. The power is transmitted to the belts 17c through the pulleys 6a, 6a' and pulleys 17a. The stalk cutter device 10 is driven by a transmission system (not shown).

The operation of the harvester will be described.

In order to harvest root vegetables such as carrots by the harvester 1, the frame 7 of the picker/conveyer device 6 is set to a proper position on the bars 13 and 15 of the body 1a in dependency on the distance between the rows of the carrots in the field. In the present invention, the carrots C are harvested in two rows at the same time. The driver sits on the seat 21 in order to operate the harvester. The digger blade 8 of the picker/conveyer device 6 is positioned above the rows. The depth of the blade 8 is adjusted by the hydraulic cylinders 29. The engine 3 is started to drive the crawlers 2 and the harvester 1 is moved in the forward direction along the rows. The belts conveyers 6c, 6c', digger blade 8, raking belts 9d, positioning discs 25 and rotary blade 26, and discharge belts 17c are operated. The blade 8 digs up the carrots C in the field together with the soil around the roots R and the stalks S of the carrots C are raked by the projections 9a of the belts 9d of the raking device 9. The stalks S are engaged between the front ends of the belts 6c and 6c' and picked up from the field and conveyed in the rearward direction. When the carrot C reaches the cutter device 10, the root R is guided by the positioning discs 25. Since the stalk S of the carrot is urged to the upward by the belts 6c, 6c' the upper end portion of the root R is positioned by the discs 25. Then, the stalk S is cut off by the blade 26 at the predetermined position. The root R drops into the container 11. The stalks S held by the belts 6c and 6c' are fed to the belts 17c of the discharge device 17 and dropped on the field at the rear end of the belts.

Figure 7:
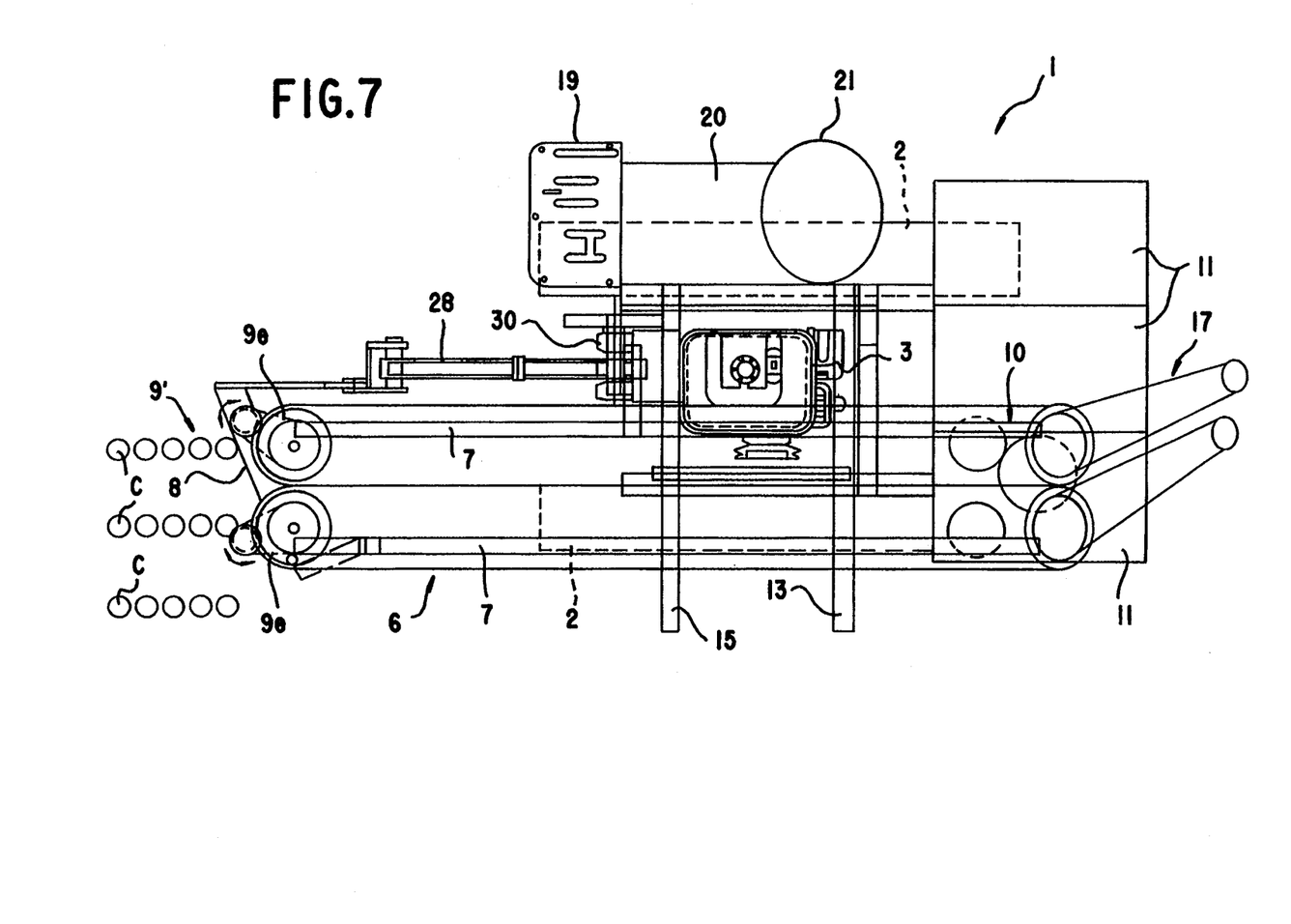
FIG. 7 is a plan view showing a modification of a raking device.

Referring to FIG. 7 showing a modification of the raking device 9, a raking device 9' has a pair of endless belts 9e without projections 9a in FIG. 1. The axle of each pulley 9c is opend in a V-shape in a horizontal plane.

Figure 8:
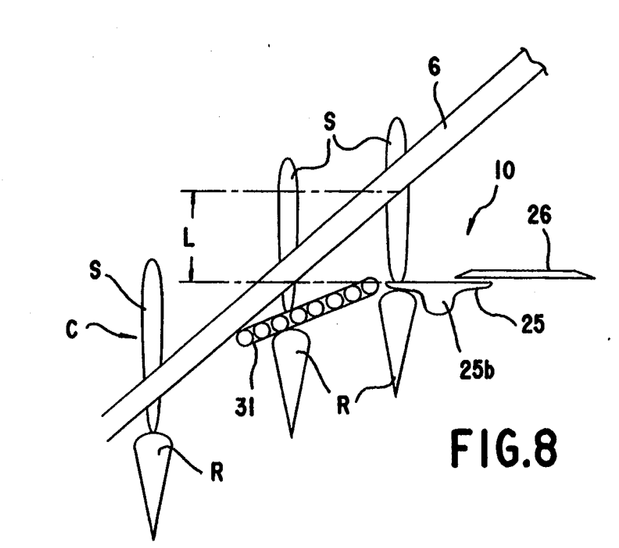
FIG. 8 is a side view showing a modification of the stalk cutter device.
Figure 9:
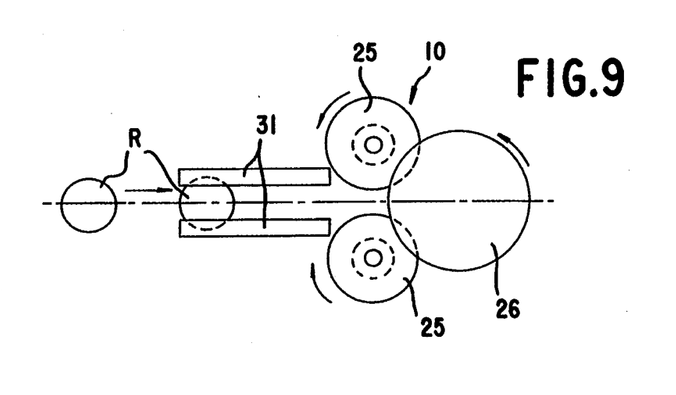
FIG. 9 is a plan view of FIG. 8.

FIG. 8 and 9 show a modification of the stalk cutter device 10. In the modification, a pair of guide members 31 are provided between the belts 6c, 6c' and the discs 25. Each of the guide member 31 comprises a plastic plate, metallic plate, or a plurality of rollers disposed in line.

When the carrot C is guided to the device 10 through the guide members 31, the stalk S to be cut is set to a predetermined length L. Thus, the cutting operation is exactly performed.

Figure 10:
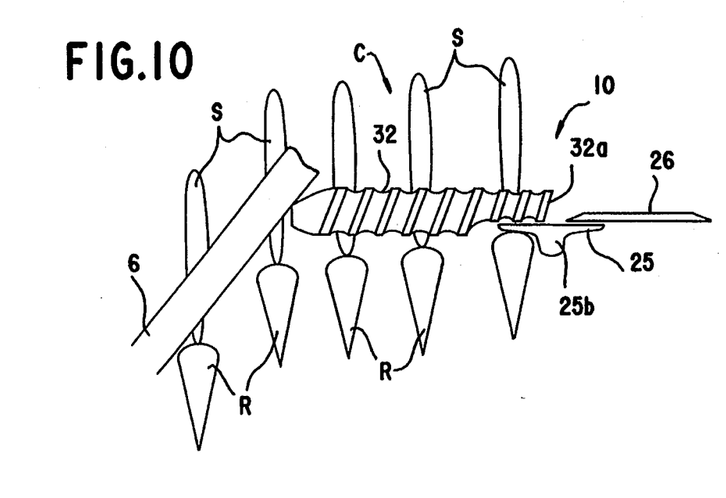
FIG. 10 is a side view showing another modification of the cutter device.
Figure 11:
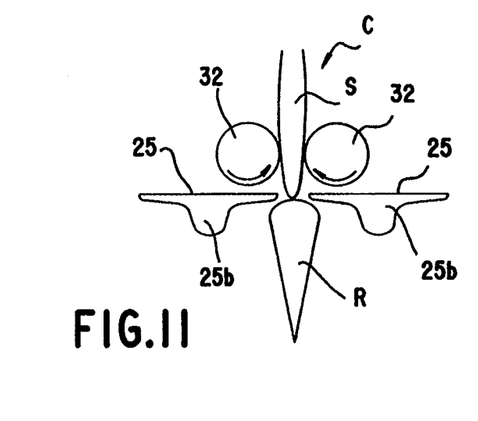
FIG. 11 is a rear view of FIG. 10.

Referring to FIGS. 10 and 11 showing a further modification of the device 10, a pair of screw conveyers 32 are provided between the belts 6c, 6c' and the discs 25. The conveyer 32 has an end portion 32a having a small diameter.

During the cutting operation, the root R of the carrot is accurately positioned between the discs.

Figure 12:
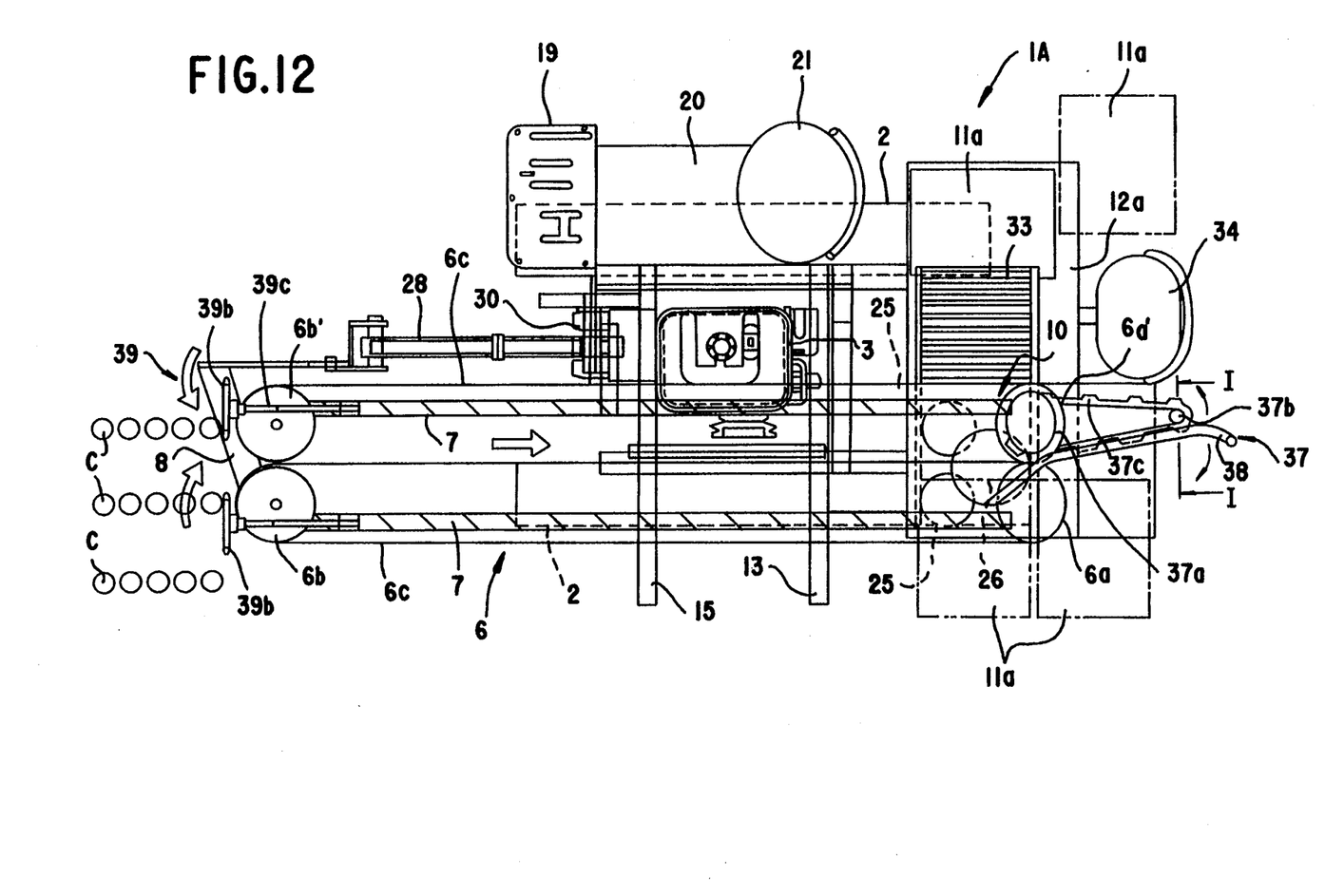
FIG. 12 is a plan view showing a second embodiment of the harvester according to the present invention.
Figure 13:
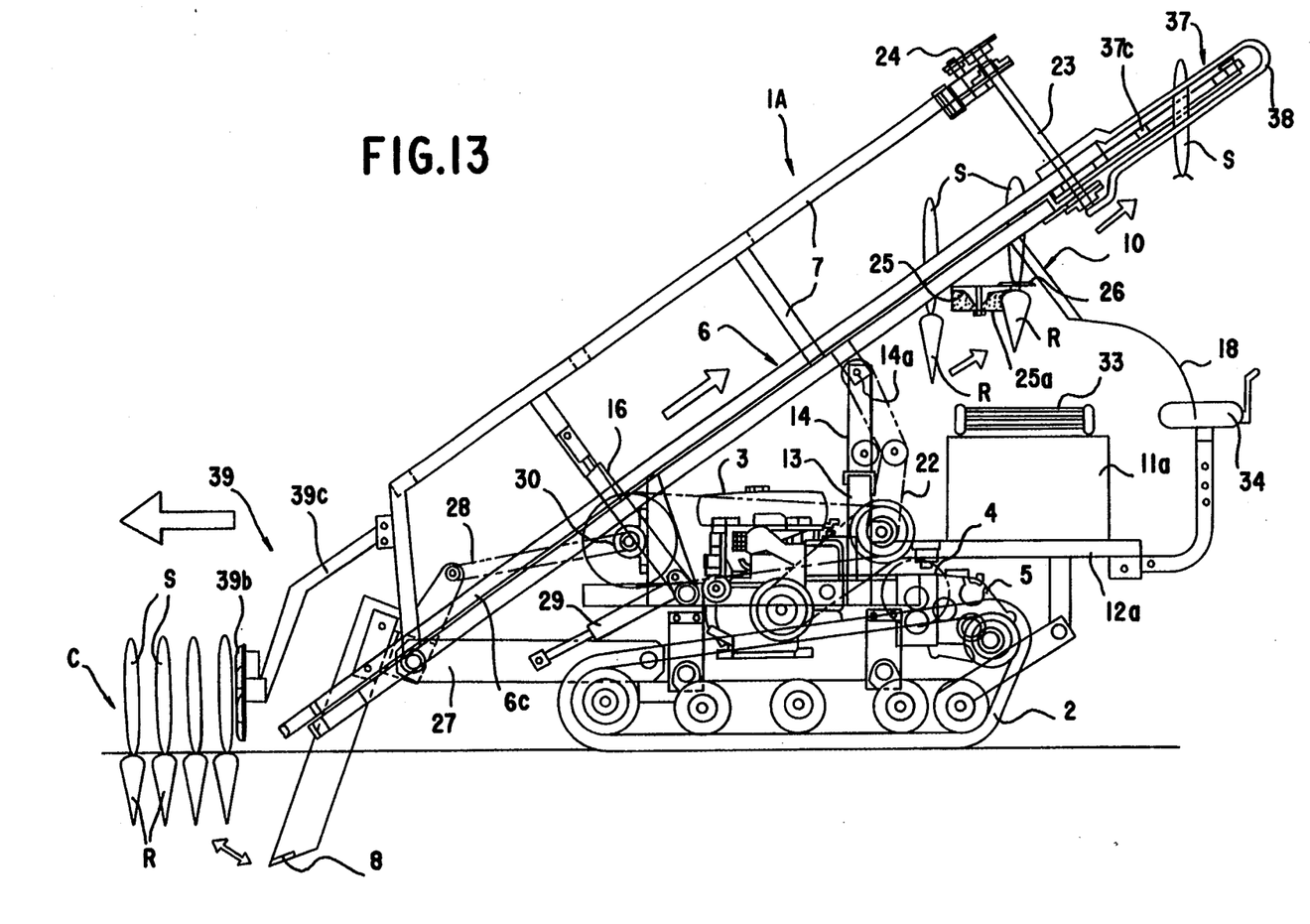
FIG. 13 is a side view of the second embodiment.

Referring to FIGS. 12 and 13 showing the second embodiment of the carrot harvester, the same parts as the first embodiment are identified with the same reference numerals as FIGS. 1 to 11.

Figure 14:
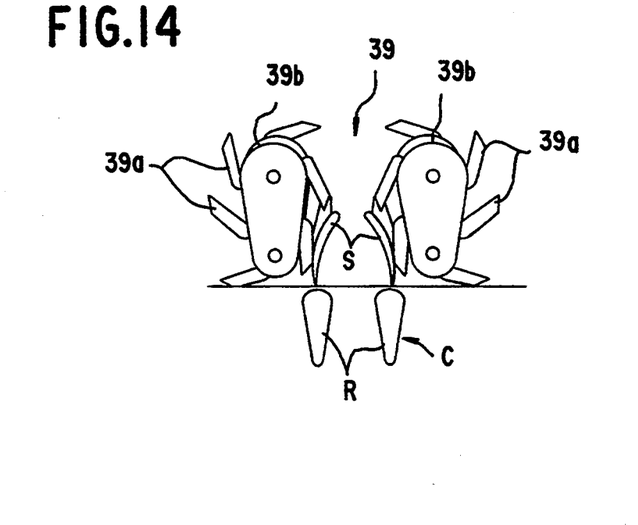
FIG. 14 is a schematic front view of a raking device of the second embodiment.

In a carrot harvester 1A of the second embodiment, a raking device 39 is mounted on the frame 7 at the front of the picker/conveyer device 6. Referring to FIG. 14, the device 39 comprises a pair of base plates 39b each of which is secured to the frame 7 through a frame 39c (FIG. 13). A plurality of projections 39a are provided on the periphery of the base plate 39b to be rotated around the base plate by a motor or flexible tube (not shown). During the harvesting, the stalks S of the carrots C are raked by the projections 39a in the upper direction.

Figure 15:
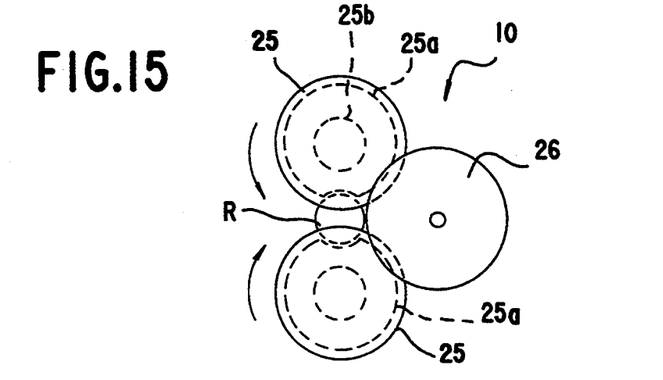
FIG. 15 is a schematic plan view of a stalk cutter device of the second embodiment.
Figure 16:
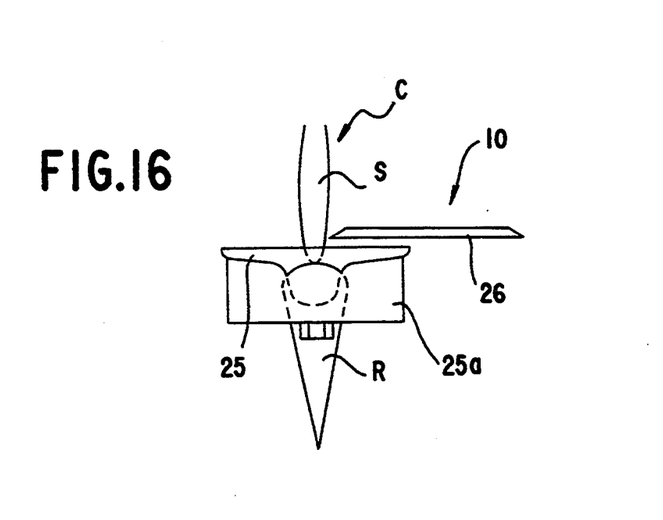
FIG. 16 is a side view of the cutter device.
Figure 17:
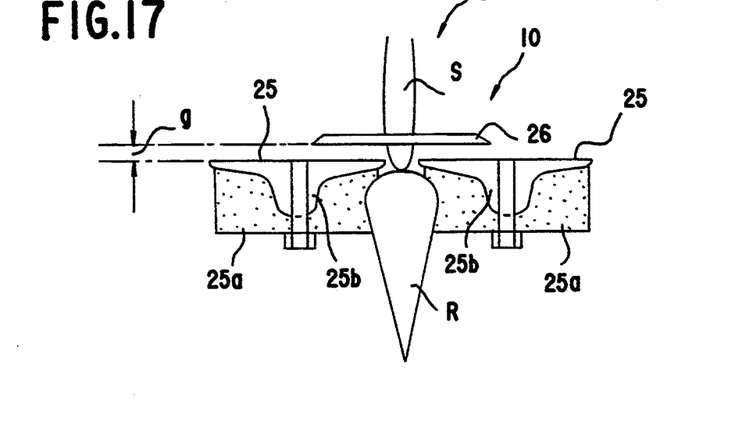
FIG. 17 is a rear view of the cutter device.

Referring to FIGS. 15 to 17, the positioning disc 25 of the cutter device 10 is provided with a guide roll 25a made of elastic material such as sponge and secured to the lower portion of the disc 25 around the lower projection 25b. During the cutting operation for the stalk S by the blade 26, the carrot C is positioned by the discs 25, while the guide roll 25a engages the upper portion of the root R.

Thus, the stalk S can be cut off at a desired position with accuracy.

At a lower portion of the cutter device 10, a grading conveyer 33 is provided in a lateral direction for grading the roots R dropped from the device 10. The grading conveyer 33 comprises a series of rods forming an endless belt.

A working seat 34 is detachably mounted on a stand 12a at a side of the conveyer 33 for grade working of the roots R.

At a lower portion of the conveyer 33 and around the working seat 34, a plurality of containers 11a are detachably mounted on the stand 12a. The roots R sorted by a worker on the seat 34 are put in corresponding containers 11a. In place of the container, a sack can be used.

If the grade working is not performed, the working seat 34 and some of the containers 11a are removed from the stand 12a. The stand 12a can be folded on the body 1a.

Figure 18:
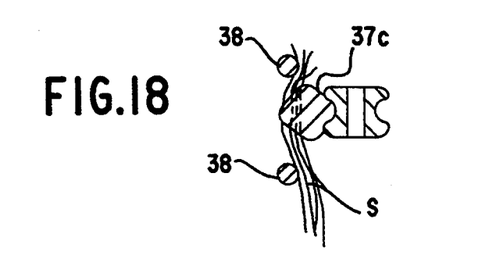
FIG. 18 is a sectional view showing a stalk discharge device of the second embodiment taken along a line I—I of FIG. 12.

A stalk discharge device 37 comprises an endless belt 37c engaged with a large pulley 37a coaxially mounted on the drive pulley 6a' and a small pulley 37b rotatably mounted on a base plate, and a guide link 38 disposed adjacent to the belt 37c. The stalk S is engaged between the belt 37c and the link 38 and fed to the rear of the harvester. The rear end of the discharge device 37 is pivoted in plane about a shaft of the pulley 6a' so as to vary the discharge position of the stalk.

The harvester 1A of the second embodiment is operated with the same manner as the first embodiment.

During the harvesting, the roots R are manually graded by the worker sit on the seat 34. The worker grades the roots R during feeding of the roots. The roots R are sorted in dependency on the size and shape of the root, and the graded roots R are put in the corresponding containers 11a. The remaining soil and impurities are dropped on the field from the end of the conveyer 33.

When the harvester 1 reaches the end of the rows, the driver operates to change the travelling direction thereof. Since it is possible to swivel the crawlers 2, the travelling direction can be easily changed, even if during the harvesting where the digger blade 8 is in the soil. Other than that, the driver serves as the worker for grading the roots R.

Figure 19:
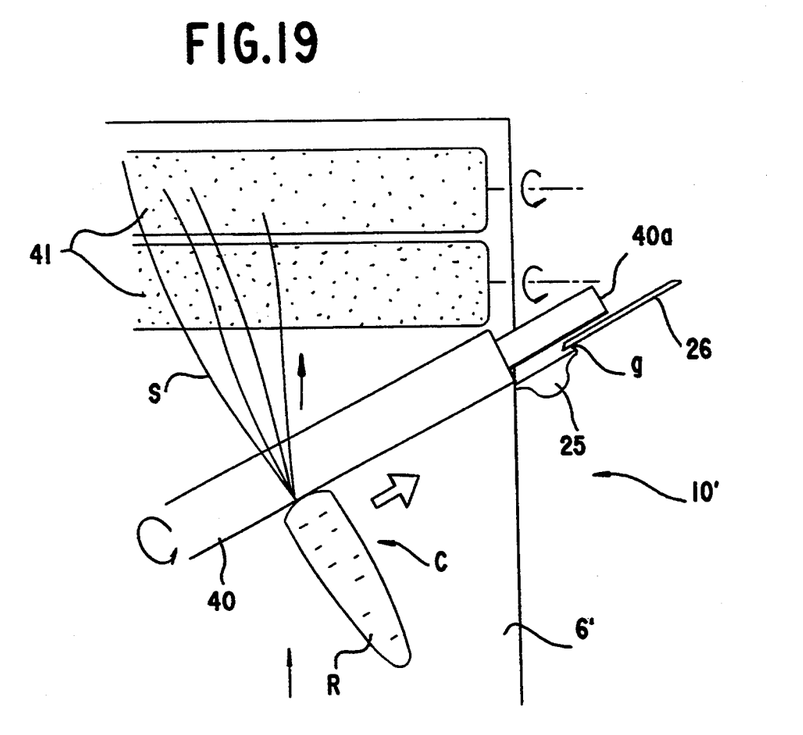
FIG. 19 is a plan view showing another example of the stalk cutter device.
Figure 20:
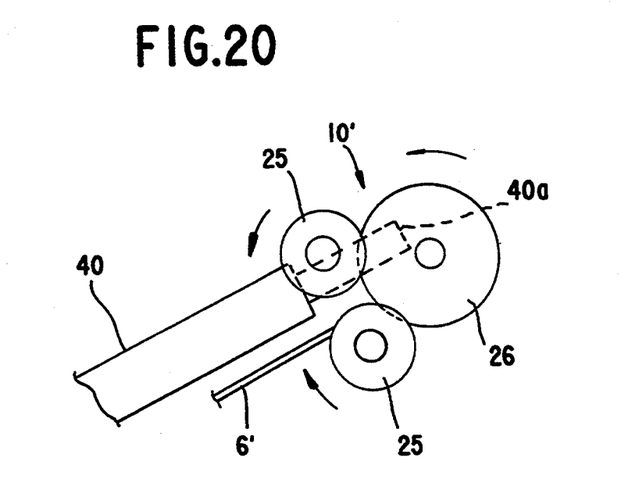
FIG. 20 is a front view of the example.
Figure 21:
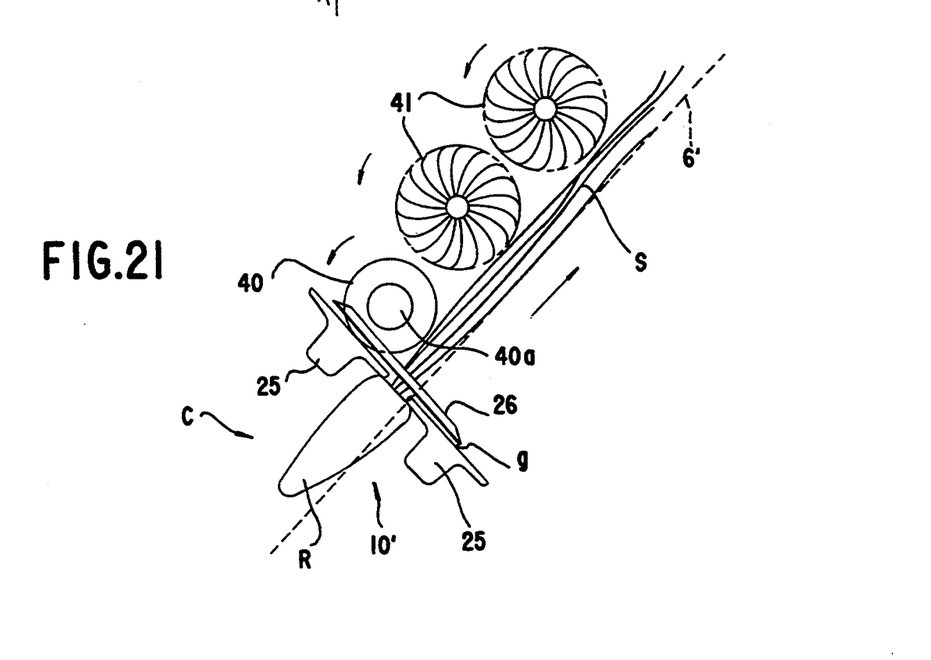
FIG. 21 is an explanatory side view of the example.

FIGS. 19 to 21 show another example of the stalk cutter device 10. A stalk cutter device 10' is provided with a lead roller 40 rotatably mounted on a belt conveyer 6' in the lateral direction. The roller 40 is disposed to be upwardly inclined in the moving direction of the conveyer with a predetermined gap between the conveyer 6' and the roller 40. The roller 40 has an upper projecting end 40a having a small diameter. A pair of drawing rollers 41 made of brush are rotatably mounted on the conveyer 6' at the rear of the lead roller 40. The rollers 41 are provided perpendicular to the conveying direction and a predetermined gap is provided between the conveyer 6' and the roller 41. The positioning discs 25 are vertically disposed adjacent to the projecting end 40a of the roller 40 at an extension of the outer periphery of the roller. The rotary blade 26 is vertically provided corresponding to the discs 25.

Describing the operation, when the carrot C conveyed on the conveyer 6' reaches the lead roller 40, the stalk S of the carrot C is led in the gap between the conveyer 6' and the roller 40 in accordance with the movement of the conveyer and the rotation of the roller. The root R of the carrot remains at the front of the roller 40. The stalk S is further drawn by the drawing rollers 41. The carrot C is moved a direction upward along the roller 40. When the carrot is disengaged from the roller 40, the carrot is engaged with the projecting end 40a to be engaged with the discs 25. In this state, since the stalk S is drawn by the rollers 41, the upper end of the carrot is positioned between the discs 25. The stalk S is cut off by the blade 26 and conveyed to the rear of the conveyer 6' and discharged from the end of the conveyer by the rollers 41. The root R is put in the container (not shown).

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A harvester for root vegetables comprising:
   a body,
   a pair of crawlers for supporting and moving the body,
   an engine for driving the crawlers through a power transmitting system,
   a picker/conveyor device longitudinally provided on the body and downwardly inclined for picking up root vegetables;
   a stalk cutter device provided under the picker/conveyor device at the rear position thereof for cutting off a stalk from a root, and
   a pair of guide disks associated with said conveyor device and disposed before said stalk cutter device, in direct contact with said root vegetables, said guide disks directly guiding said root vegetables into operative association with said stalk cutter device.

2. A harvester according to claim 1 further comprising
   a digger blade provided before a front end of the picker/conveyer device so as to dig up root vegetables in a field.

3. A harvester according to claim 1 further comprising
   a container provided under the stalk cutter device for receiving a root cut off by the stalk cutter device.

4. A harvester according to claim 1 wherein
   the picker/conveyer device is laterally movably provided for adjusting the lateral position of the picker/conveyor device.

5. A harvester according to claim 1 further comprising
   a grading conveyer laterally disposed under the stalk cutter device for receiving roots dropped from the stalk cutter device and for conveying thereof.

6. A harvester according to claim 1 further comprising
   a raking device provided before the picker/conveyer device for guiding and raking stalks of the root vegetables.

7. A harvester according to claim 1 further comprising
   a stalk discharge device provided after the picker/conveyer device, the stalk discharge device comprising a pair of endless belts.

8. A harvester according to claim 1 further comprising
   a pair of drawing rollers made of brush provided above the picker/conveyer device for drawing stalks of the root vegetables.

9. A harvester according to claim 1 further comprising
   a pair of guide members provided between the picker/conveyer device and the guide discs.

10. A harvester according to claim 1 further comprising a screw conveyer provided between the picker/conveyer device and the guide disks.

11. A harvester according to claim 1 wherein the distance between the guide discs and the stalk cutter device is adjustable.

12. A harvester according to claim 1 further comprising
    a guide disc made of elastic material and mounted on each of the guide discs for guiding the root.

13. A harvester according to claim 6 wherein the grading conveyer comprises a series of rods forming an endless belt.

14. A harvester according to claim 6 further comprising
    a working seat detachably provided adjacent the grading conveyer.

15. A harvester according to claim 6 further comprising
    a plurality of containers provided adjacent the grading conveyer for receiving sorted roots.

* * * * *